Figure 9:
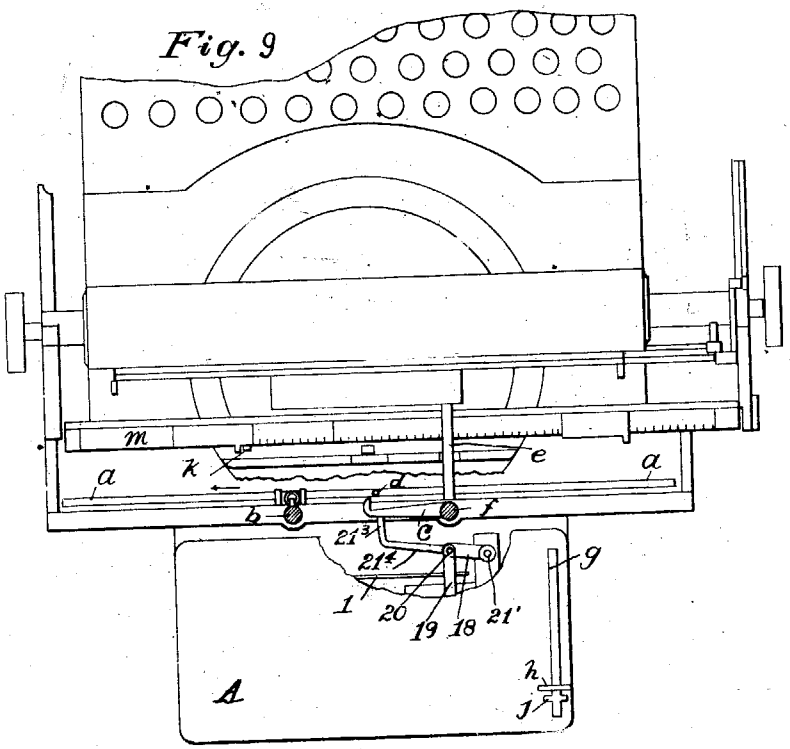

H. BATES.
TIME CONTROLLED, COIN OPERATED LOCKING DEVICE FOR TYPE WRITER MACHINES.
APPLICATION FILED AUG. 29, 1908.
Reissued June 1, 1909.
12,967.
5 SHEETS—SHEET 1.
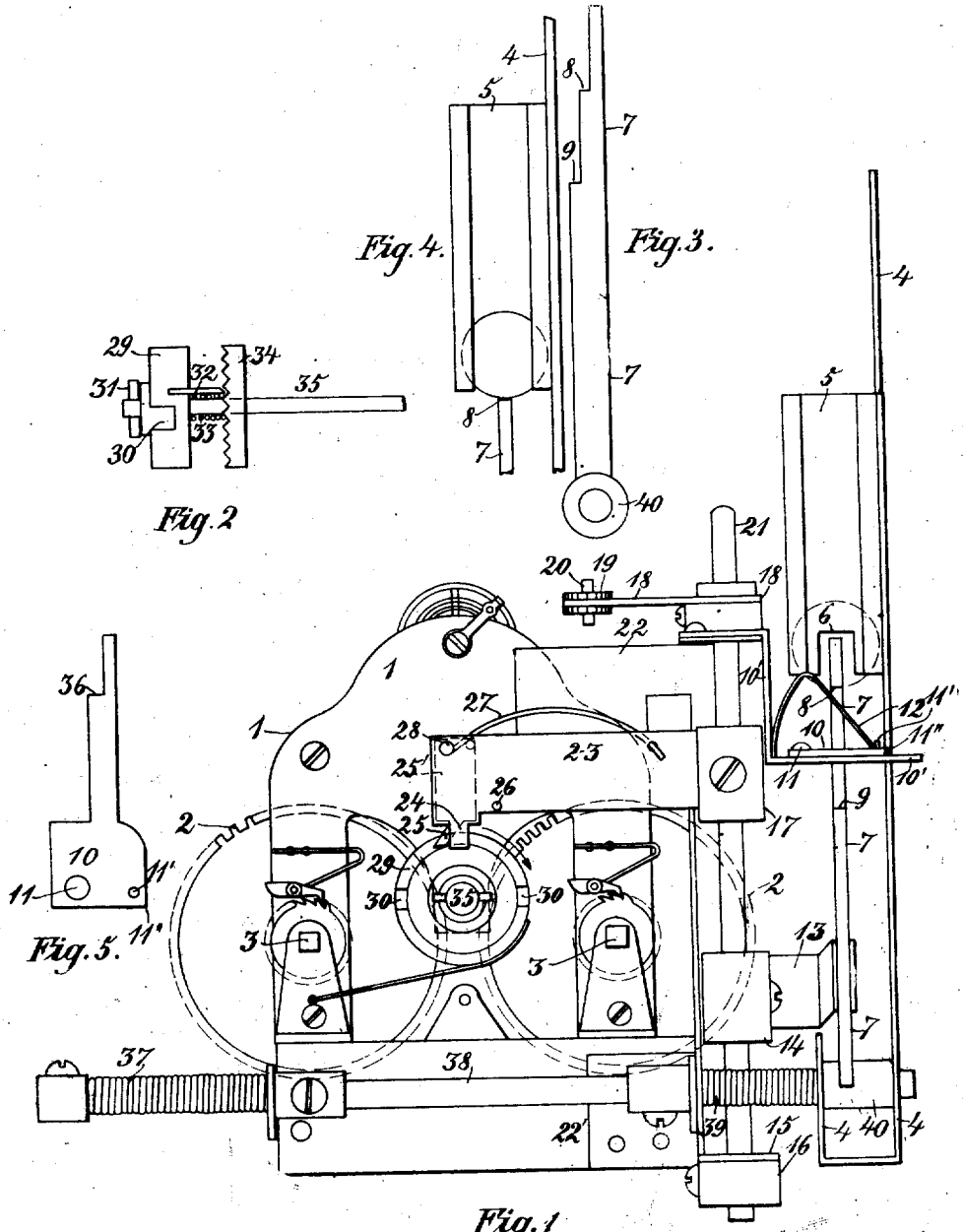
Witnesses:
John O. Seifert
H. Frankfort
Inventor
Harry Bates
By his Attorney
B. Sutherland H. BATES.
TIME CONTROLLED, COIN OPERATED LOCKING DEVICE FOR TYPE WRITER MACHINES.
APPLICATION FILED AUG. 29, 1908.
Reissued June 1, 1909.
12,967.
5 SHEETS—SHEET 2.
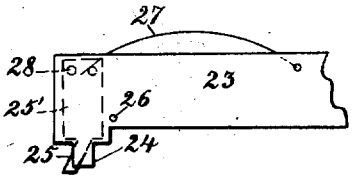
Fig. 6.
Fig. 7.
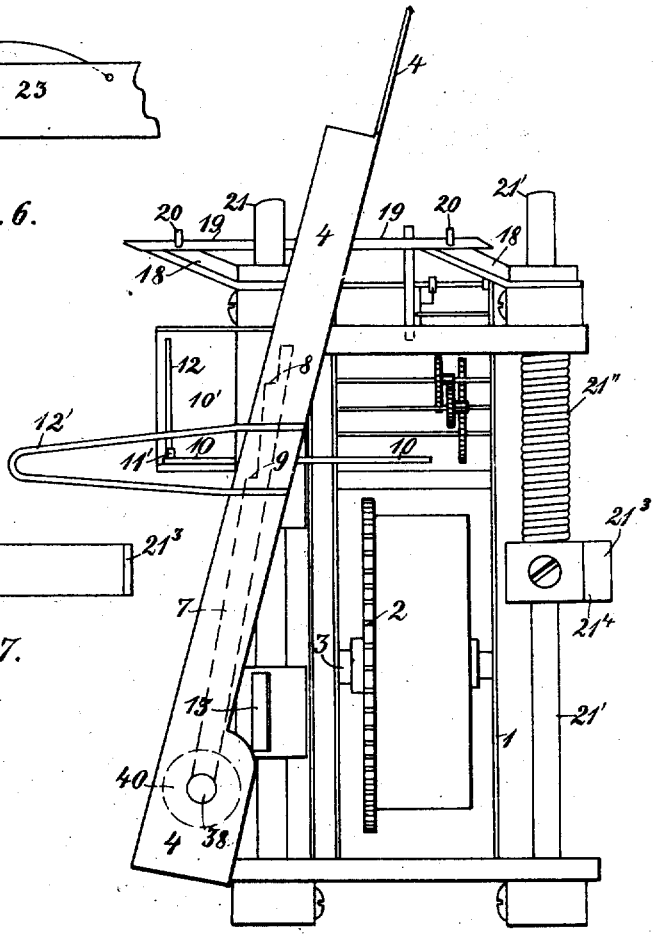
Fig. 8.
Witnesses:
John O. Seifert
A. C. Frankfort
Inventor:
Harry Bates.
By his Attorney
B. C. Stickney.

H. BATES.

TIME CONTROLLED, COIN OPERATED LOCKING DEVICE FOR TYPE WRITER MACHINES.

APPLICATION FILED AUG. 29, 1908.

Reissued June 1. 1909.

12,967.

5 SHEETS—SHEET 3.

Witnesses:
R. W. Pitt
K. Frankfort.

Inventor:
Harry Bates
By his Attorney
B. B. Stickney

H. BATES.

TIME CONTROLLED, COIN OPERATED LOCKING DEVICE FOR TYPE WRITER MACHINES.

APPLICATION FILED AUG. 29, 1908.

Reissued June 1, 1909.

12,967.

5 SHEETS—SHEET 4.

Witnesses:
John O. Seifert
H. Frankfort

Inventor.
Harry Bates,
By his Attorney
B. C. Stickney.

H. BATES.

TIME CONTROLLED, COIN OPERATED LOCKING DEVICE FOR TYPE WRITER MACHINES.

APPLICATION FILED AUG. 29, 1908.

Reissued June 1, 1909.

12,967.

5 SHEETS—SHEET 5.

Witnesses:
R. W. Pittman
K. Frankfort

Inventor:
Harry Bates
By his Attorney
B. C. Stickney

UNITED STATES PATENT OFFICE.

HARRY BATES, OF ALBANY, NEW YORK, ASSIGNOR, BY MESNE ASSIGNMENTS, TO UNDERWOOD TYPEWRITER CO., OF NEW YORK, N. Y., A CORPORATION OF NEW JERSEY.

TIME-CONTROLLED, COIN-OPERATED LOCKING DEVICE FOR TYPE-WRITER MACHINES.

No. 12,967. Specification of Reissued Letters Patent. Reissued June 1, 1909.

Original No. 883,854, dated April 7, 1908, Serial No. 318,642. Application for reissue filed August 29, 1908. Serial No. 450,860½.

*To all whom it may concern:*

Be it known that I, HARRY BATES, a citizen of the United States, residing in Albany, in the county of Albany and State of New York, have invented a new and useful Time-Controlled, Coin-Operated Locking Device for Type-Writer Machines, of which the following is a specification, reference being had to the accompanying drawings, forming part thereof.

The object of my invention is to provide a means whereby a typewriting machine may be operated at predetermined times only by unlocking and then locking its mechanism by inserting or making use of a cash payment of any certain predetermined sum of money inserted into the device with the purpose that such typewriting machine may be placed in a hotel or any public or other place thereby enabling anyone to obtain the use of the machine for practice or for practical writing purposes by depositing the predetermined sum of money, say ten cents, in the attachment for the use of the same for say, one-half hour, when the machine will lock and it will be impossible to obtain use of it until another ten cents is deposited when the locking device will unlock and remain so unlocked for the space of half an hour or the predetermined space of time at the end of which time the typewriting machine will lock fast.

One way in which I accomplish this end is shown in the drawings hereto annexed and which form a part of this specification.

Figure 1 shows the front face of the clock mechanism as it is attached to the typewriting machine in side elevation; Fig. 2 an edge view of two of the operating wheels attached or hung on the minute hand shaft of the clockworks; Fig. 3 a side elevation of one of the levers; Fig. 4 a face view of the coin conduit with a portion of the lever seen in Fig. 3; Fig. 5 a plan view of the trip device; Fig. 6 a rear side elevation of a portion of locking mechanism; Fig. 7 a side elevation of the locking finger; Fig. 8 an end elevation of clockwork; Fig. 9 a top plan view of a typewriting machine with portion broken away and my mechanism in its box operatively attached to the typewriting machine and Fig. 10 the rear view of a typewriting machine showing some of the moving parts used in connection with my clock mechanism. Fig. 11 is a perspective view showing the parts in the same positions as Fig. 1. Fig. 12 is a detail plan to illustrate the manner in which the main handle or lever of the coin mechanism, during its return to normal position, releases the coin-operated lever from the control of a latch.

The clockwork 1 as shown is an ordinary eight day clock to be found on the general market. It has two driving spring actuated wheels 2, 2. To the shaft of the minute hand arbor 35 I firmly fix the toothed wheel 34 and on the same shaft I loosely set the wheel 29 having two slots 30, 30, through its rim and the finger or indent 32 I firmly attach to wheel 29 and bring its free end to a knife edge. Between these two wheels I place a spring 33 which acts to keep the wheels separate by pushing wheel 29 as far toward the end of shaft as it will go and when no pressure is exerted against the outer rim of wheel 29 spring 33 prevents the knife edge of finger or indent 32 from engaging with the teeth on wheel 34 and the clockworks will run and revolve wheel 34 only, which it is designed to do, while the typewriting machine is not in use, after it has come to rest at the end of a specified time, and in this mechanism predetermined as thirty minutes or half an hour. In order to have the motions of wheel 29 accomplish this locking and unlocking, to one side of the clock frame I attach the brackets 22 and 22′ and 15 and 15′, and by means of these brackets set up the vertical shafts 21 and 21′ (see Figs. 1 and 8) which shafts have a small rotary movement in the brackets by means of spring 21″, and are connected by the frame composed of arms 18, 18, their outer ends being pivoted to the cross bar 19 by the pins 20, 20 and has slight motion laterally by means of the pivots. On the shaft 21 is firmly hung the arm 23 (see Fig. 1) that has a depending short leg 24 which lies just in front of wheel 29 ready to slip into either of the slots 30 which may present themselves to it.

In order that the leg 24 shall leave the slots 30 absolutely and not reënter the slot again instantly, I pivot a plate 25′ (see Fig. 6) by the pivot 28 to rear side of arm 23, so it will swing on that pivot and provide it with a slanting and forward protruding leg 25 and assist the protruding leg to assume a forward position as seen in Fig. 6 by the light spring 27, and prevent the plate from a too far backward swing by the stop 26. A retreating motion from and an approaching motion toward wheel 29 is given arm 23 and its attachment through a slight rotary movement given to shaft 21 through the arms 18, 18 and cross-bar 19 by the spring 21″ on shaft 21′ by means of the coin conduit 5 and lever 7, the coin conduit 5 being attached to the lever 4 as seen, and lever 4 fastened to the revoluble rod 38 a rearward motion given to lever 4 will cause a revolution of rod 38 against the spring of coiled springs 37 and 39 and on releasing lever 4 it will spring forward with considerable force and take its normal position without disturbing lever 7. Lever 7 is seen in Fig. 3 and has notches 8 and 9 and is firmly attached to rotating sleeve 40 which rotates on rod 38 freely and without interference with lever 4, being also spring actuated.

At 10 (see Fig. 5) is a plate pivoted to the floor of bracket 10′ and has a projection 11′ or pin against which spring 12 presses and swings the tongue with its notch 36 to the left and this is done so that when lever 7 is pushed back along the notched side of the tongue the notch will engage with the lever 7, and hold it fast until lever 4 with the coin conduit and the coin fly back into their normal position and in doing which, lever 4 strikes against the corner projection 11″ of plate 10 and crowds notch 36 out of engagement with lever 7 when lever 7 flies to its normal position striking the coin and knocking it free into a receptacle for it. While levers 4 and 7 were being operated as above described, lever 7 also came into contact with lever 13 and pushed it rearward giving a rotary motion to shaft 21 and to shaft 21′ against the resilience of spring 21″ which revoluble movement swung arm 23 away from wheel 29 and its leg 24 out of the slot 30 together with the inclined and spring actuated leg 25 which latter leg swung forward by pressure of spring 27 and laid beyond the slot and against the outer rim of the wheel and would not allow leg 24 to again enter the slot until one half an hour had been expended and spring actuated leg 25 had made the circuit and had itself entered one of the slots 30 and thus acted as a guide to leg 24. While the above described movement was taking place, the lever $21^4$ had the same movement as arm 23, moving away and from the clock-works in unison, that is, while leg 24 on arm 23 was moving out of the slot 30 and was kept from entering the slots for one half hour, or until the next slot presented itself to the leg in enterable position, the lever $21^4$ with its engaging end $21^3$ was drawn away from hook *c* (see Fig. 9) and that hook being spring actuated released itself from pin *d* and the rod *a* was free again to make its necessary back and forth motion or endwise motion necessary to allow the carriage to make its steplike motion to have the necessary spaces between the printed words on the paper, but when the engaging end $21^3$ of lever $21^4$ is moved outward by leg 24 on arm 23 entering slot 30 in wheel 29 that slot is just deep enough to make the movement of leg 24 and arm 23 enough to thrust engaging end $21^3$ of lever $21^4$ into contact with hook *c* and force that hook to engage with pin *d* and prevent the typewriter from working until another coin was inserted and the levers operated.

At Figs. 1 and 11 the position of the revolving notched wheel 29, with reference to the released leg or latch 24, shows that about fifteen minutes have elapsed since the last releasing operation; the wheel 29 having revolved for about one half the distance between its opposite notches 30, and a half hour being required before movement of the wheel, after the latches are released from one notch, to bring the other notch into engagement with the latches. The wheel 29 is traveling in the direction shown by the arrow, so that in about fifteen minutes the left-hand notch 30 will reach the latches 25 and 24, so that they may spring into the notch.

The notch in the wheel reaches the loose latch 25 first, and then catches it and turns it about the pivot 28 until it registers with the latch 24, *i. e.*, assumes an upright position behind the latter. At this moment said notch 30 is in register with the latch 24; and the spring 33 (surrounding the arbor 35) is enabled to press the wheel 29 outwardly along said arbor to a sufficient extent to release the knife-edge or pawl 32 from its engagement with the teeth on the constantly revolving wheel 34, so that the latch 24 may not stop the clock when the wheel 29 is arrested. At the same time that this pawl-releasing movement of wheel 29 occurs, there is also a movement of the arm 23 which carries the latches 24 and 25; the movement of this arm being in the opposite direction from that of the wheel 29, and being effected by a spring 21″ on the vertical shaft 21′. It will be understood that said spring 21″ tends constantly to turn the shaft 21′ to the right, and by the connections 18, 19, 20 to turn the vertical shaft 21 also to the right, and thereby to press backwardly the arm 23, which is fixed on said vertical shaft 21. The latches 24, 25 are thus constantly tending to move to notch-engaging position. At the same time the arm or lever $21^4$ on said shaft 21′ swings the locking lever or dog *c* (on the vertical shaft or turning-post *f*) into position to engage the pin *d*, for the purpose of locking the typewriter and hence preventing the manipulation thereof, to render it unusable until again released by the coin-controlled mechanism. This locking or disabling of the typewriting machine occurs whenever the wheel 29 is latched by means of either of its notches 30; and while the wheel is so latched, the pawl 32 is disengaged from the clock-wheel 34, and hence the latter continues to revolve and the clock to run, although the typewriting machine is locked against manipulation.

When, after the parts have arrived at the normal condition just described, it is desired to unlock the typewriting machine, so that it may be manipulated, a coin is deposited in the coin chute or conduit 5, and slides down the same, and comes to rest upon a notch or step 8 on the upper end of the upstanding lever 7, as seen clearly at Fig. 11. At this time, the coin blocks or covers the opening or cutaway 6 in the bottom of the chute 5 (the latter secured upon the handle or lever 4.) It will be understood that when said opening is not blocked, the handle 4 may be swung to and fro freely without any effect upon the machine; but when said opening is blocked, as at Figs. 1 and 11, movement of the handle 4 to the right at Fig. 11 causes the upstanding arm 7 to swing in the same direction, since the flanges of the chute 5 press the coin (seen in dotted line) against the upper end of the lever or arm 7; or in other words, the coin serves temporarily as an interponent between the driver 4, 5 and the driven member 7. The use of the coin therefore enables the operator to swing the arm 7, which in turn rocks the arm 13 on vertical shaft 21 in a direction to swing the arm 23 on the same shaft away from the wheel 29, so that the latches 24, 25 are withdrawn from the notch 30 in said wheel; this being done against the tension of the spring 21″ on shaft 21′, which latter is connected to shaft 21 in the manner already explained. At the same time, the arm $21^4$ on said shaft 21′ is withdrawn, and the locking dog *c*, usually provided on the typewriter, releases the pin *d*, and hence the typewriting machine may be operated freely during the half hour required for sufficient revolution of the wheel 29 to bring its other notch into register with the latches 24, 25. During the initial stroke of the coin-actuated notched arm 7, just referred to, it moves to the right at Fig. 11 along the edge of a spring-actuated catch 10, until it is caught in the notch 36 in said catch where it is held temporarily. The operator then releases the handle 4, and the same is returned by springs 37 and 39 and engages a suitable corner or shoulder 11″ on the latch 10, and turns said latch to release the coin-operated arm 7. During such return movement of handle 4, the coin 6 slips off from the step 8 in the now motionless arm 7, and falls out of the chute 5 onto the step 9. Thence it may fall into any suitable receptacle. Upon the latch 10 being turned to release the lever 7, the latter is returned toward normal position by the spring 21″, acting through the train of mechanism already described, including arm 13. On its return after actuation, the handle 4 may be arrested by an arm 12′ (Fig. 8) thereon, contacting with any fixed part, as for instance a portion of the casing A in which the clock work is contained. When the coin-operated lever 7 is released from the latch 10, the spring 21″ is permitted to press the arm 23 and the latch 25 back against the edge or periphery of the notched wheel 29, whereby said wheel is pressed back against the tension of spring 33, to cause an engagement of the pawl 32 with the teeth of the wheel 34, so that the wheel 29 may be caused to rotate with the clock-work for the ensuing half hour or other suitable period.

It will be understood that the latch 25 is spring-actuated, and, upon escaping from either notch 30 in the wheel, springs to a position out of line with the latch 24, and stands slantingly ahead thereof. This prevents the latch 25 (and consequently the latch 24) from reëntering the notch 30 from which the latches were just withdrawn; and of course latch 24 cannot again enter a slot until another half revolution of the notched wheel 29.

3 shows the winding posts of the clock.

Figure 10:
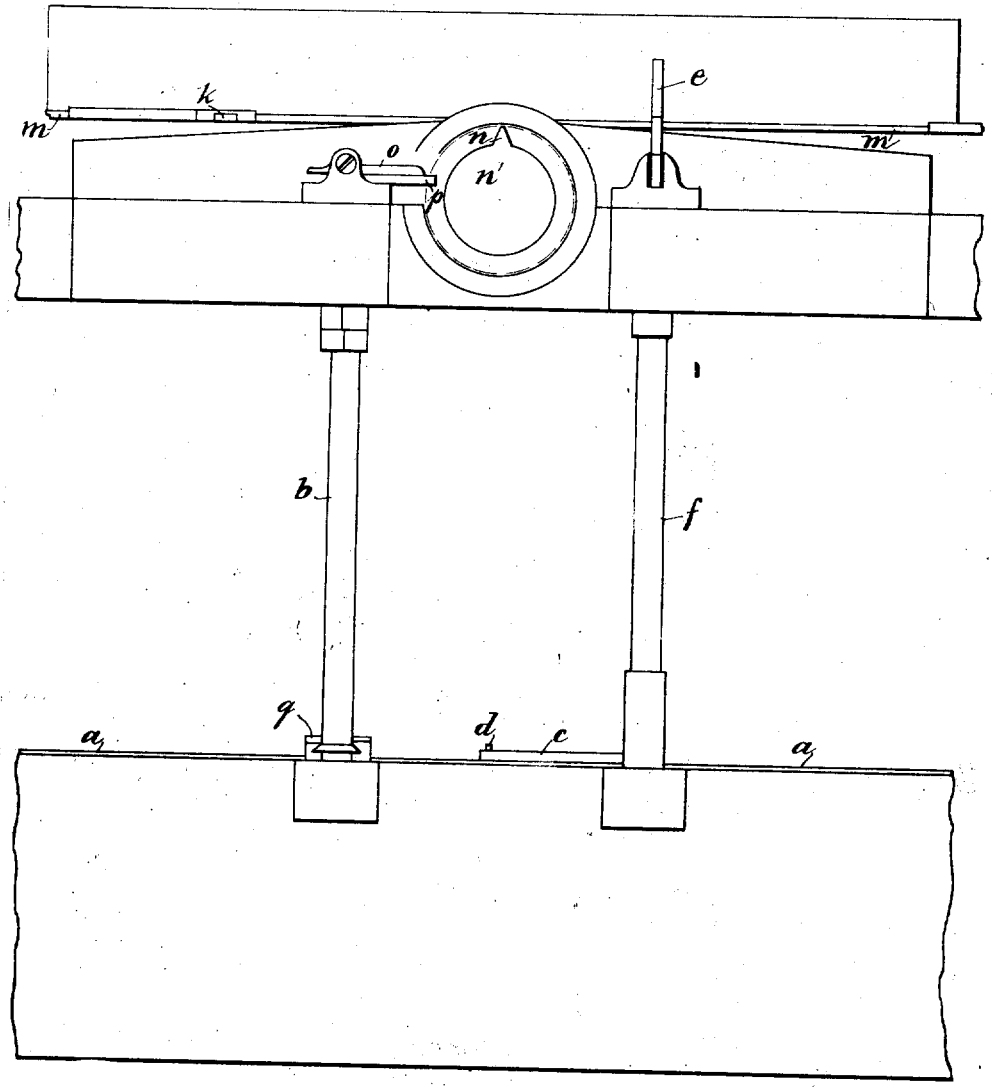
Figures 11, 12:
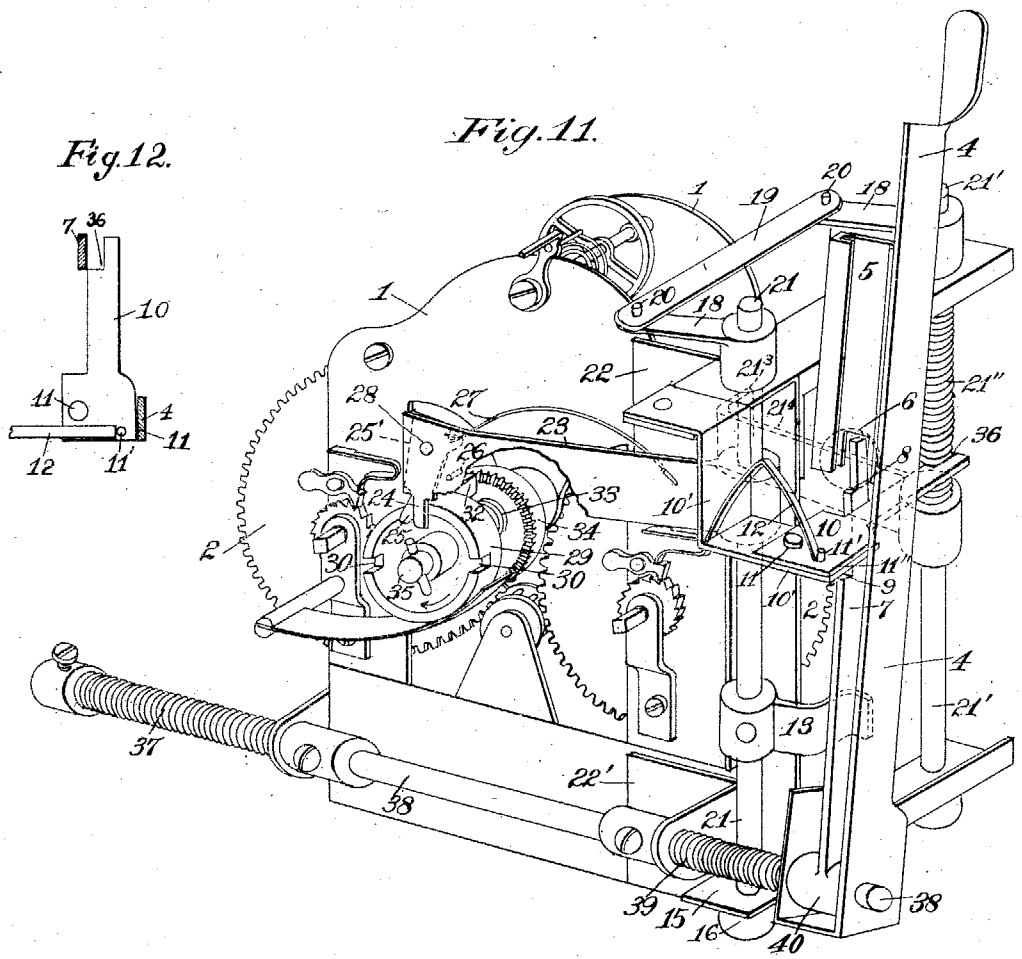

Fig. 10 shows a rear elevation, and Fig. 9 a plan (with my invention added) of a common typewriting machine, simply for the purpose of showing my device in operative connection with a typewriting machine. It is customary for the post or vertical shaft *b* to rock slightly at every keystroke of the typewriter, said shaft carrying at its top the ordinary spacing dogs *o* and *p*, which work into and out of the teeth of an escapement wheel *n′*; one of said teeth being shown at *n*, and the remainder being indicated by a dotted circle. This escapement wheel *n′* is connected to the usual paper carriage, of which *m* indicates a part.

The vertical shaft *b* is usually rocked by means of a bar *a*, the latter being reciprocated endwise by the keys, and connected by an arm *q* to said shaft *b*. Thus the operation of any key causes swinging action of the dogs *o* and *p* into and out of the teeth of the escapement wheel *n′*, whereby step-by-step feed of the carriage is permitted.

Upon the part *m* of the carriage is the usual catch *k*, which when the line of writing is about completed, engages an arm *e* and drives it to the right at Fig. 9. Said arm *e* is fixed upon a vertical rock shaft *f*. Also fixed upon the latter is a hook *c*, which is vibrated into the path of a pin *d* which is fixed upon said reciprocating bar *a*. This has the effect of preventing reciprocation of said bar *a*, and hence it becomes impossible to operate the keys, so that the typewriting machine is usually locked fast at the end of each line. The above described typewriter mechanism and operation are common and well known in the art.

My time-controlled device automatically operates by means of the device $21^3$, to operate the hook *c* of the typewriter after the machine has been in use a half an hour and regardless of the position of the carriage of the typewriter.

The catch *c* forms a part of the typewriting machine; and the part $21^3$, $21^4$ forms a movable device normally engaging the part *c* of the typewriting machine, to hold it in the path of the pin *d* to prevent the operation of the bar *a*, and hence to prevent the operation of the typewriting machine; means being provided to move the part $21^3$, $21^4$ to abnormal position upon the deposit of a coin and operation of lever 4; and at the end of a predetermined period, the time-controlling mechanism coöperates with means to restore said movable device $21^3$, $21^4$ to effective position.

I do not confine myself in my invention to the type of typewriting machine shown, but claim it broadly when used with any typewriting machine, my object being to provide any typewriting machine with an automatically operating, time-controlled locking device so that by the prepayment of a certain amount of money the typewriting machine will be unlocked and be operated for a predetermined space of time and at the end of the time be automatically locked fast, whatever portion of the typewriting machine may be used as the point at which to lock it, or whatever may be the mechanism adopted to operate the locking device.

Having now described my invention so that those skilled in the art may know how to make and use the same, what I desire to secure by Letters Patent is:

1. The combination of a typewriter mechanism, a lock therefor, and time-controlling mechanism for predetermining the moment of locking of said lock after the same has been unlocked.

2. The combination of a typewriter mechanism, a lock adapted to engage therewith, and time controlling mechanism for predetermining the moment of engagement of the lock with the typewriter mechanism after the lock has been unlocked.

3. The combination of a typewriter mechanism, a lock therefor, means for releasing the lock, and time-controlling mechanism whereby the lock is returned to locking position after a predetermined interval.

4. The combination of a typewriter mechanism, a lock adapted to arrest the writing movements thereof, operator-controlled means for releasing the lock, and time controlling mechanism whereby the lock is returned to locking position after a predetermined interval.

5. The combination of a time controlled mechanism, operating means for actuating the same out of normal position, automatic means for returning the same to normal position, a time controlling mechanism, and a rotatable member adapted to be coupled with said time controlling mechanism when the time controlled mechanism is actuated out of normal position and to be uncoupled after a predetermined interval, and while coupled to maintain said time controlled mechanism in actuated position.

6. The combination of a time controlled mechanism, operating means for actuating the same out of normal position, a spring tending to return the mechanism when actuated, a time controlling mechanism, and a rotatable member adapted to be coupled with said time controlling mechanism when the time controlled mechanism is actuated out of normal position and to be uncoupled after a predetermined interval, and while coupled to maintain said time controlled mechanism in actuated position against the tension of said spring.

7. The combination of a time controlled mechanism, operating means for actuating the same out of normal position, automatic means for returning the same to normal position, a continuously running time controlling mechanism, and a rotatable member adapted to be coupled with said time controlling mechanism by said automatic means through the instrumentality of said time controlled mechanism when the latter is actuated out of normal position, and to be uncoupled after a predetermined interval, and while coupled to maintain said time controlled mechanism in actuated position.

8. The combination of a time controlled mechanism, operating means for actuating the same out of normal position, a time controlling mechanism, a rotatable member having a region constructed to maintain said time controlled mechanism in actuated position for a predetermined interval, being adapted to be coupled with said time controlling mechanism but normally uncoupled therefrom, and automatic means for returning the time controlled mechanism to normal position, which operates, when said mechanism is actuated out of normal position, to engage the same with said region, causing said member to couple with the time-controlling mechanism.

9. The combination of a time controlled mechanism, operating means for actuating the same out of normal position, a time controlling mechanism, a recessed wheel adapted to be coupled with said time controlling mechanism but normally uncoupled therefrom, said time controlled mechanism being normally in engagement with the recessed portion of the wheel and adapted to be maintained in actuated position by the non-recessed portion when in engagement with the latter, and automatic means for returning the time-controlled mechanism to normal position, which operates, when said mechanism is actuated out of normal position, to engage the same with the non-recessed portion of the wheel, causing the latter to couple with the time-controlling mechanism.

10. The combination of a time controlled mechanism, operating means for actuating the same out of normal position, a time controlling mechanism, a rotatable member having a region constructed to maintain said time-controlled mechanism in actuated position for a predetermined interval, being adapted to be coupled with the time controlling mechanism but normally uncoupled therefrom, automatic means for returning the time-controlled mechanism to normal position, which operates, when said mechanism is actuated out of normal position, to engage the same with said region, causing said member to couple with the time controlling mechanism, and means for automatically uncoupling said member when said region has traveled out from engagement with the time controlled mechanism.

11. The combination of a time controlled mechanism, operating means for actuating the same out of normal position, a time controlling mechanism including a shaft, a recessed wheel loose on said shaft, normally disengaged clutch members between said wheel and said shaft, said time controlled mechanism being normally in engagement with the recessed portion of the wheel and adapted to be maintained in actuated position by the non-recessed portion when in engagement with the latter, automatic means for returning the time-controlled mechanism to normal position, which operates, when said mechanism is actuated out of normal position to engage the same with the non-recessed portion of the wheel, causing said clutch members to engage, and a spring operating to disengage the clutch members when the non-recessed portion of the wheel travels out from engagement with the time controlled mechanism.

12. The combination of a time controlled mechanism, operating means for actuating the same out of normal position, a time controlling mechanism, a recessed wheel adapted to be coupled with said controlling mechanism but normally uncoupled therefrom, said time controlled mechanism being normally in engagement with the recessed portion of the wheel and adapted to be maintained in actuated position by the non-recessed portion thereof when in engagement with the latter, and having a spring-actuated tooth adapted when the time controlled mechanism is released from said recessed portion to advance over the non-recessed portion to prevent immediate reëngagement of the time controlled mechanism with said recessed portion, and automatic means for returning the time-controlled mechanism to normal position, which operates, when said mechanism is actuated out of normal position, to engage the same with the non-recessed portion of the wheel, causing the wheel to couple with the time-controlling mechanism.

13. The combination of a clock-work including a revolving shaft or arbor, a toothed wheel or clutched member fixed upon said shaft, a second wheel splined to said shaft and having a slot, and also having a clutch member projecting toward said toothed wheel, a spring to move said slotted wheel to open the clutch, an arm having both a movable leg or latch and a fixed leg mounted to slip into and out of the slot, a finger-piece to move said arm to withdraw the legs from the slot, a typewriting machine, a movable device to normally prevent its use or manipulation, means controlled by said finger-piece while withdrawing said legs from said slot, to move said movable device to ineffective position, and a spring to return said arm and cause said legs to enter the slots, and cause said movable device to return to normal position.

14. The combination of a typewriter mechanism, a movable device to prevent the same from being manipulated, said movable device normally in effective position, means to move said movable device to ineffective position, and a time-controlling mechanism cooperating with means to restore said movable device to effective position.

15. The combination with a typewriting machine, of a movable device normally preventing the manipulative use of such machine, a clock mechanism, a member connected to said movable device, means to couple said member to the clock mechanism when said movable device is moved to ineffective position, and a spring to return said movable device to effective position and uncouple said member from said clock mechanism after an interval determined by said clock-mechanism.

16. The combination with a typewriting machine and a movable device normally effective to prevent the manipulation thereof, of a clock-work, means to move said movable device to ineffective position and place it under control of the clock-work and restore it to effective position after an interval determined by said clock-work.

17. The combination with a typewriting machine, of a normally effective movable device for preventing the manipulation of the same, a time-controlling mechanism normally uncoupled from said movable device, and means for moving said movable device to ineffective position and concomitantly coupling it to said time-controlling mechanism, to maintain said movable device in such ineffective and coupled position for a period determined by said time-controlling mechanism, and then to uncouple it from said time-controlling mechanism and restore it to normal position.

18. The combination of a manipulable machine, a movable device normally preventing manipulation of said machine, a clock-work, a finger-piece whereby said movable device may be moved out of normal position, a spring tending to restore said movable device to normal position, and a member to detain said movable device in ineffective position, said detaining member operable by the clockwork to release said movable device.

19. The combination of a manipulable machine, a movable device normally preventing manipulation of said machine, a finger-piece whereby said movable device may be moved out of normal position, a spring to restore said movable device to normal position, a member to detain said movable device in ineffective position, a clockwork, and means for enabling said finger-piece to connect said detaining member to said clockwork to be caused thereby to release said movable device and permit said spring to restore the latter to normal position.

20. The combination of a manipulable machine, a movable device normally preventing manipulation of said machine, a finger-piece whereby said movable device may be moved out of normal position, a spring to restore said movable device to normal position, a member to detain said movable device in ineffective position, a clockwork, means for enabling said finger-piece to connect said detaining member to said clockwork to be caused thereby to release said movable device and permit said spring to restore the latter to normal position, and means to disconnect said detaining member from said clockwork.

21. The combination of a typewriting machine, a lock normally preventing the manipulation of said machine, means to release said lock, means for restoring said lock permanently to effective position, and measuring or limit-determining mechanism connected to said releasing means and designed to act during the manipulation of the typewriting machine, for automatically determining the point at which said lock shall be permanently restored to normal position.

22. The combination of a typewriting machine, a device whereby a part of the typewriter mechanism is normally maintained out of condition for manipulation, manually operable mechanism to move said device to an abnormal position to permit manipulation of the typewriting machine, means to restore said device permanently to normal position, and measuring or limit-determining mechanism connected to said manually-operable mechanism and designed to act during the manipulation of the typewriting machine, for automatically determining the point at which said device shall be permanently restored to normal position.

23. The combination with a typewriting machine, of a device normally preventing the manipulation of said machine, means for moving said device to ineffective position, means to restore said device permanently to normal position, and measuring mechanism connected to said restoring means to operate during the manipulation of the typewriter, for determining the point at which said device shall be permanently restored to normal position.

24. The combination with a typewriting machine, of a device normally preventing the manipulation of said machine, means for moving said device to ineffective position, means to restore said device permanently to normal position, and time-measuring mechanism connected to said restoring means to operate during the manipulation of the typewriter, for determining the point at which said device shall be permanently restored to normal position; means being provided to disconnect the time-measuring mechanism to permit it to run while the typewriting machine remains out of condition for manipulation.

25. The combination of a typewriter mechanism, measuring mechanism, and a device for disabling the typewriter mechanism, said device connected to the measuring mechanism, to be restored thereby to normal effective position.

26. The combination of a typewriter mechanism, measuring mechanism, and a lock for the typewriter mechanism, said lock connected to the measuring mechanism, to be restored by the latter to normal effective position.

HARRY BATES.

Witnesses:
JOHN O. SEIFERT,
CLARA RIPLEY.